(12) United States Patent
Medles et al.

(10) Patent No.: US 11,811,698 B2
(45) Date of Patent: **\*Nov. 7, 2023**

(54) METHOD AND APPARATUS FOR REDUCING UPLINK OVERHEAD IN MOBILE COMMUNICATIONS

(71) Applicant: MediaTek Singapore Pte. Ltd., Singapore (SG)

(72) Inventors: Abdelkader Medles, Cambridge (GB); Mohammed S Aleabe Al-Imari, Cambridge (GB); Xiu-Sheng Li, Hsinchu (TW)

(73) Assignee: MediaTek Singapore Pte. Ltd., Singapore (SG)

( \* ) Notice: Subject to any disclaimer, the term of this patent is extended or adjusted under 35 U.S.C. 154(b) by 220 days.

This patent is subject to a terminal disclaimer.

(21) Appl. No.: 17/246,625

(22) Filed: May 1, 2021

(65) Prior Publication Data

US 2021/0258125 A1 Aug. 19, 2021

Related U.S. Application Data

(63) Continuation of application No. 16/244,327, filed on Jan. 10, 2019, now Pat. No. 11,032,051.
(Continued)

(51) Int. Cl.
| | |
|---|---|
| *H04L 5/00* | (2006.01) |
| *H04L 1/1812* | (2023.01) |
| *H04W 72/23* | (2023.01) |

(52) U.S. Cl.
CPC .......... *H04L 5/0055* (2013.01); *H04L 1/1812* (2013.01); *H04W 72/23* (2023.01)

(58) Field of Classification Search
CPC ... H04L 5/0055; H04L 1/1812; H04L 1/1854; H04W 72/23
See application file for complete search history.

(56) References Cited

U.S. PATENT DOCUMENTS 11,032,051 B2 \* 6/2021 Medles ................. H04L 1/1854
2014/0369242 A1 \* 12/2014 Ng ..................... H04W 72/0453
370/280
(Continued)

FOREIGN PATENT DOCUMENTS

| CN | 103270710 A | 8/2013 |
| CN | 104521304 A | 4/2015 |
| WO | WO 2012087006 A1 | 6/2012 |

OTHER PUBLICATIONS

China National Intellectual Property Administration, First Office Action for China Patent Application No. 201980007467.X, dated Oct. 11, 2021.
(Continued)

*Primary Examiner* — Walli Z Butt
(74) *Attorney, Agent, or Firm* — Han IP PLLC; Andy M. Han

(57) ABSTRACT

Various solutions for reducing uplink overhead with respect to user equipment and network apparatus in mobile communications are described. An apparatus may monitor a downlink channel. The apparatus may determining whether downlink control information (DCI) is received on the downlink channel. The apparatus may skip a hybrid automatic repeat request-acknowledgement (HARQ-ACK) feedback transmission on an uplink channel in an event that no DCI is received on the downlink channel.

10 Claims, 5 Drawing Sheets

Related U.S. Application Data

(60) Provisional application No. 62/616,599, filed on Jan. 12, 2018.

(56) References Cited

U.S. PATENT DOCUMENTS

| | | | |
|---|---|---|---|
| 2015/0341912 A1* | 11/2015 | Kim | H04L 1/201 370/329 |
| 2016/0212734 A1 | 7/2016 | He et al. | |
| 2019/0014563 A1* | 1/2019 | Lee | H04W 72/56 |
| 2019/0363840 A1* | 11/2019 | Wang | H04L 1/1861 |

OTHER PUBLICATIONS

China National Intellectual Property Administration, First Office Action in China Patent Application No. 202210305183.2, dated Apr. 28, 2023.

Huawei et al.: "Dynamic adaptation of PUCCH formats with HARQ-ACK feedback for carrier aggregation enhancement beyond 5 carriers", 3GPP TSG RAN WG1 RL1, TSGR1_82, R1-153772.

* cited by examiner

METHOD AND APPARATUS FOR REDUCING UPLINK OVERHEAD IN MOBILE COMMUNICATIONS

CROSS REFERENCE TO RELATED PATENT APPLICATION(S)

The present disclosure is part of a continuation of U.S. patent application Ser. No. 16/244,327, filed on 10 Jan. 2019, which is a non-provisional application claiming the priority benefit of U.S. Patent Application No. 62/616,599, filed on 12 Jan. 2018. The contents of aforementioned applications are incorporated by reference in their entirety.

TECHNICAL FIELD

The present disclosure is generally related to mobile communications and, more particularly, to reducing uplink overhead with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), Type-1 hybrid automatic repeat request-acknowledgement (HARQ-ACK) codebook transmission is introduced to improve transmission reliability. When a user equipment (UE) is configured with "physical downlink shared channel (pdsch)-HARQ-ACK-Codebook=semi-static", the UE needs to report HARQ-ACK information for a corresponding PDSCH reception or semi-persistent scheduling (SPS) PDSCH release in a HARQ-ACK codebook. The HARQ-ACK codebook should be transmitted in a slot indicated by a value of a PDSCH-to-HARQ_feedback timing indicator field in a corresponding DCI format.

However, the HARQ-ACK codebook Type 1 may lead to increased overhead on the uplink. The UE may need to transmit additional HARQ-ACK information on the uplink and may increase the uplink signaling overhead. Even if there is no downlink control information (DCI) received for a plurality of physical downlink control channel (PDCCH) occasions corresponding to the physical uplink control channel (PUCCH) or physical uplink shared channel (PUSCH) HARQ-ACK transmission occasion, the HARQ-ACK information may still be transmitted. This may lead to higher UE power consumption and increased radio interference.

Accordingly, how to reduce uplink overhead and save UE power consumption may be important in the newly developed communication system. It is needed to provide proper mechanisms to determine whether to transmit the semi-static HARQ-ACK codebook or not according to some rules.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to reducing uplink overhead with respect to user equipment and network apparatus in mobile communications.

In one aspect, a method may involve an apparatus monitoring a downlink channel. The method may also involve the apparatus determining whether DCI is received on the downlink channel. The method may further involve the apparatus skipping a HARQ-ACK feedback transmission on an uplink channel in an event that no DCI is received on the downlink channel.

In one aspect, a method may involve an apparatus receiving a DCI. The method may also involve the apparatus determining whether to transmit a HARQ-ACK feedback according to a DAI in the DCI. The method may further involve the apparatus transmitting the HARQ-ACK feedback in an uplink channel in an event that the DAI is assigned. The method may further involve the apparatus skipping the HARQ-ACK feedback transmission in an event that the DAI is not assigned.

In one aspect, an apparatus may comprise a transceiver capable of wirelessly communicating with a network node of a wireless network. The apparatus may also comprise a processor communicatively coupled to the transceiver. The processor may be capable of monitoring a downlink channel. The processor may also be capable of determining whether DCI is received on the downlink channel. The processor may further be capable of skipping a HARQ-ACK feedback transmission on an uplink channel in an event that no DCI is received on the downlink channel.

In one aspect, an apparatus may comprise a transceiver capable of wirelessly communicating with a network node of a wireless network. The apparatus may also comprise a processor communicatively coupled to the transceiver. The processor may be capable of receiving a DCI. The processor may also be capable of determining whether to transmit a HARQ-ACK feedback according to a DAI in the DCI. The processor may further be capable of transmitting the HARQ-ACK feedback in an uplink channel in an event that the DAI is assigned. The processor may further be capable of skipping the HARQ-ACK feedback transmission in an event that the DAI is not assigned.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to reducing uplink overhead with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, Type-1 HARQ-ACK codebook transmission is introduced to improve transmission reliability. When the UE is configured with "pdsch-HARQ-ACK-Codebook=semi-static", the UE needs to report HARQ-ACK information for a corresponding PDSCH reception or SPS PDSCH release in a HARQ-ACK codebook. The HARQ-ACK codebook should be transmitted in a slot indicated by a value of a PDSCH-to-HARQ_feedback timing indicator field in a corresponding DCI format.

However, the HARQ-ACK codebook Type 1 may lead to increased overhead on the uplink. The UE may need to transmit additional HARQ-ACK information on the uplink and may increase the uplink signaling overhead. Even if there is no DCI received for a PDCCH occasions corresponding to the PUCCH or PUSCH HARQ-ACK transmission occasion, the HARQ-ACK information may still be transmitted. This may lead to higher UE power consumption and increased radio interference.

To reduce the signaling overhead, some rules may need to be defined to avoid send HARQ-ACK codebook when it is not required. The UE may need to determine whether to transmit the semi-static HARQ-ACK codebook or not according to the pre-defined rules. The present disclosure proposes a number of schemes pertaining to reducing the uplink signaling overhead. According to the schemes of the present disclosure, the UE may skip the HARQ-ACK information transmission when some rules/scenarios are satisfied.

Figure 1:
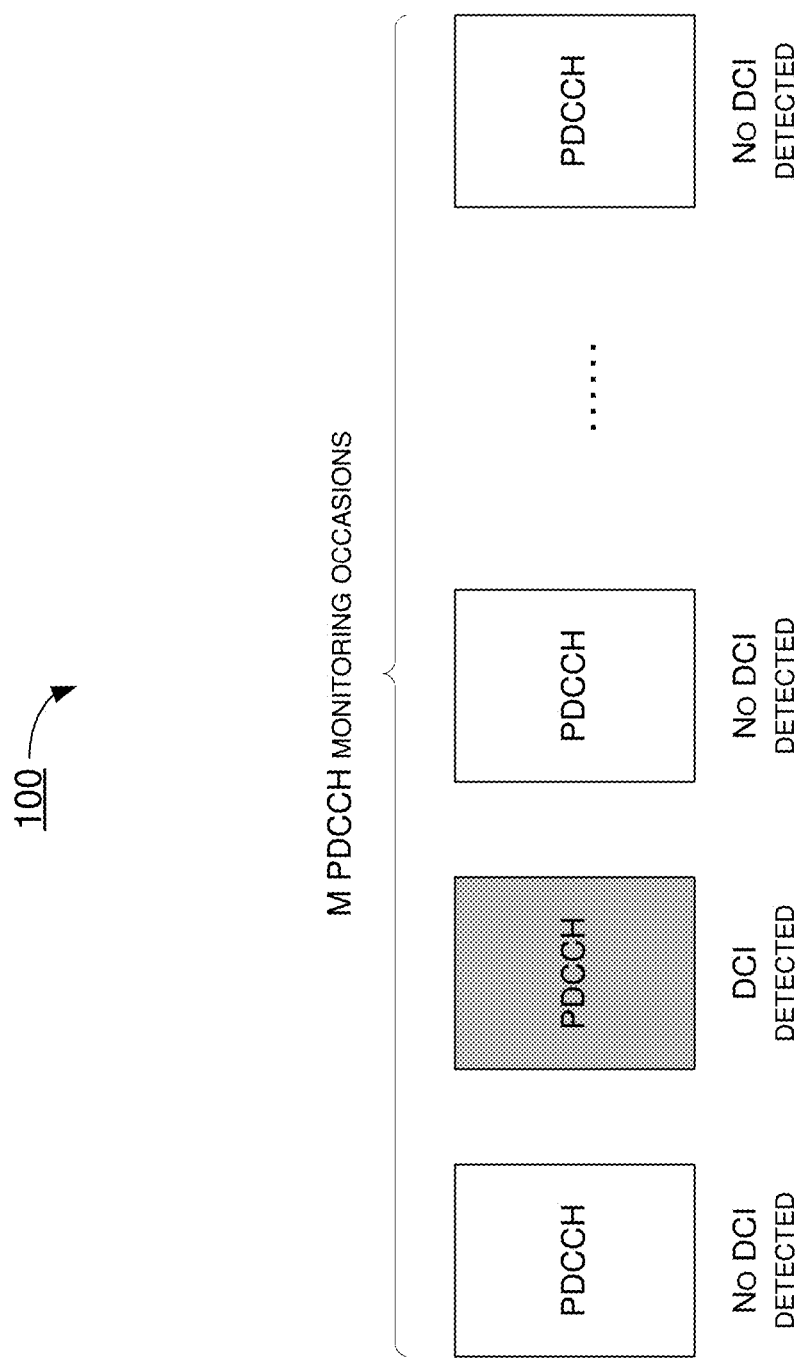
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a network apparatus, which may be a part of a wireless communication network (e.g., an LTE network, an LTE-Advanced network, an LTE-Advanced Pro network, a 5G network, an NR network, an IoT network or an NB-IoT network). The UE may be configured to camp on the network apparatus. The UE may be configured to monitor a downlink control channel (e.g., PDCCH) of the network apparatus. The UE may monitor a plurality of PDCCH monitoring occasions (e.g., M PDCCH monitoring occasions) to see whether there exist any DCI for the UE. The network apparatus may use the DCI to schedule radio resources for a downlink channel (e.g., PDSCH) or an uplink channel (e.g., PUSCH). The UE may be configured to determine whether to transmit a HARQ-ACK feedback according to the monitoring results.

For example, the DCI format 1_0 or DCI format 1_1 may be used to schedule the PDSCH of the network apparatus. In an event that at least one DCI (e.g., DCI format 1_0, DCI format 1_1, or associated DCI for PDSCH transmission) is detected by the UE, it means that there is downlink data scheduled on the PDSCH for the UE. The UE may be configured to receive the downlink data on the PDSCH according to the DCI. The UE may further be configured to transmit a HARQ-ACK feedback corresponding to the downlink data to the network apparatus. The UE may transmit the HARQ-ACK feedback on an uplink channel (e.g., PUCCH or PUSCH). For example, the UE may multiplex the HARQ-ACK feedback in the uplink channel transmission. The uplink channel may be scheduled by the DCI format 0_0 (e.g., PUSCH).

Figure 2:
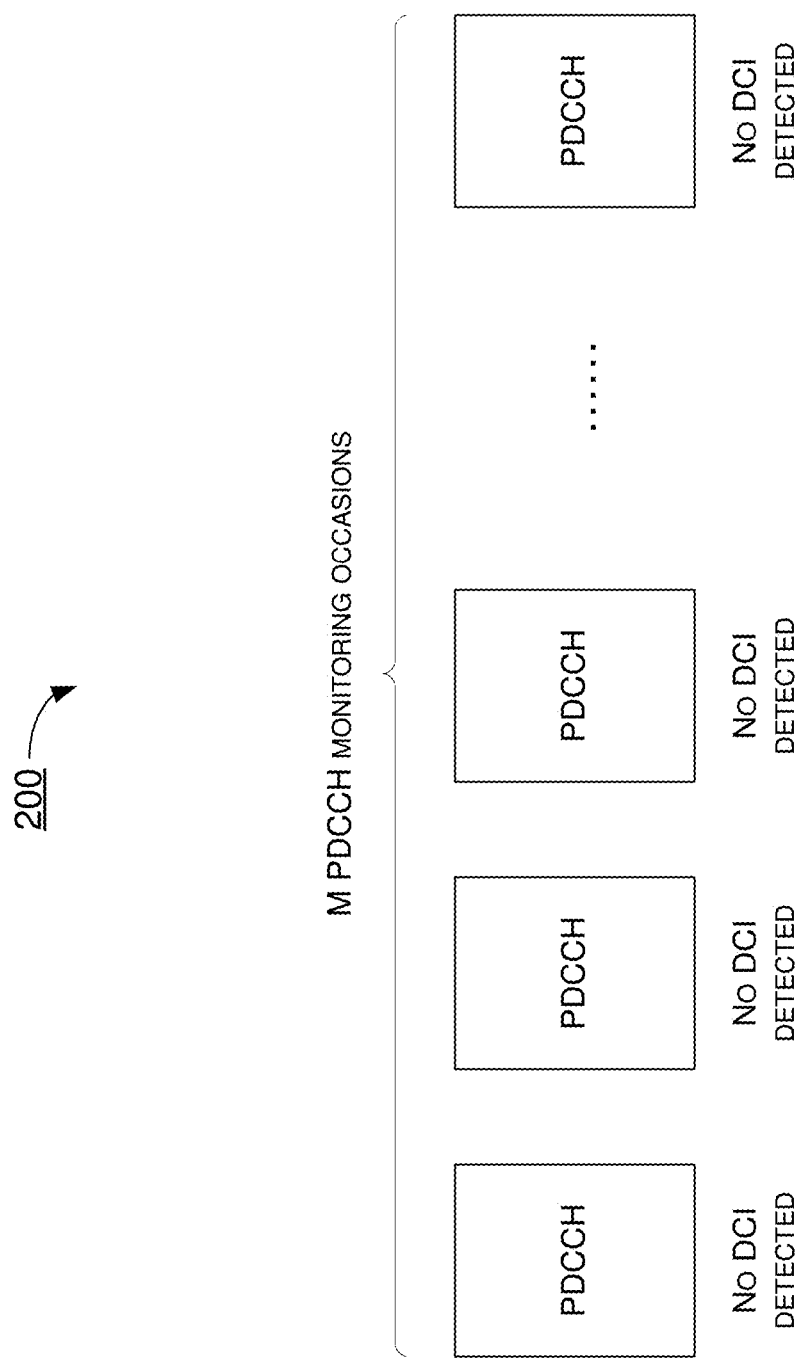
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network apparatus, which may be a part of a wireless communication network (e.g., an LTE network, an LTE-Advanced network, an LTE-Advanced Pro network, a 5G network, an NR network, an IoT network or an NB-IoT network). The UE may be configured to camp on the network apparatus. The UE may be configured to monitor a downlink control channel (e.g., PDCCH) of the network apparatus. The UE may monitor a plurality of PDCCH monitoring occasions (e.g., M PDCCH monitoring occasions) to see whether there exist any DCI for the UE. The network apparatus may use the DCI to schedule radio resources for a downlink channel (e.g., PDSCH) or an uplink channel (e.g., PUSCH or PUCCH). The UE may be configured to determine whether to transmit a HARQ-ACK feedback according to the monitoring results.

For example, the DCI format 1_0 or DCI format 1_1 may be used to schedule the PDSCH of the network apparatus. In an event that no DCI (e.g., DCI format 1_0, DCI format 1_1, or associated DCI for PDSCH transmission) is detected across the M PDCCH monitoring occasions, it means that there is no downlink data scheduled on the PDSCH for the UE. Thus, the UE may be configured to skip the HARQ-ACK feedback transmission on the uplink channel (e.g., PUSCH or PUCCH). For example, in an event that the UE has not received any PDSCH based on a value of a respective PDSCH-to-HARQ feedback timing field in a DCI format scheduling the PDSCH reception, the UE may be configured not to multiplex the HARQ-ACK feedback in the uplink channel transmission. The uplink channel may be scheduled by the DCI format 0_0 (e.g., PUSCH). Accordingly, the HARQ-ACK feedback transmission may be skipped when a pre-defined rule is satisfied (e.g., no DCI is detected). The UE may be able to reduce uplink signaling overheads, avoid radio interference and save UE power consumption.

In some implementations, the uplink channel may be scheduled by the DCI format 0_1 (e.g., PUSCH). The UE may be configured to determine whether to transmit a HARQ-ACK feedback according to a downlink assignment index (DAI) in the DCI. Specifically, the UE may be configured to receive the DCI (e.g., DCI format 0_1). The DCI may comprise a DAI field (e.g., $V_{T-DALm}^{UL}$). The DAI field may be used to indicate whether a downlink assignment is assigned to the UE. For example, when the DAI field is assigned (e.g., $V_{T-DALm}^{UL}=1$), it means that there is downlink data configured for the UE. When the DAI field is not assigned (e.g., $V_{T-DALm}^{UL}=0$), it means that there is no downlink data configured for the UE. The DAI filed may comprise one bit indication or multiple bits indication.

After receiving the DCI, the UE may be configured to determine whether the DAI is assigned. In an event that the DAI field is assigned (e.g., $V_{T-DALm}^{UL}=1$), the UE may be configured to generate a HARQ-ACK codebook and multiplex the HARQ-ACK information in the uplink channel transmission. The UE may transmit the HARQ-ACK feedback on the uplink channel (e.g., PUSCH). In an event that the DAI field is not assigned (e.g., $V_{T-DALm}^{UL}=0$), the UE may be configured not to generate a HARQ-ACK codebook for multiplexing in the uplink channel transmission. The UE may skip the HARQ-ACK feedback transmission on the uplink channel (e.g., PUSCH). Accordingly, the UE may be able to determine whether to skip the HARQ-ACK feedback transmission according to an indication (e.g., DAI) in the DCI. When the HARQ-ACK feedback transmission can be skipped, the UE may be able to reduce uplink signaling overheads, avoid radio interference and save UE power consumption.

Illustrative Implementations

Figure 3:
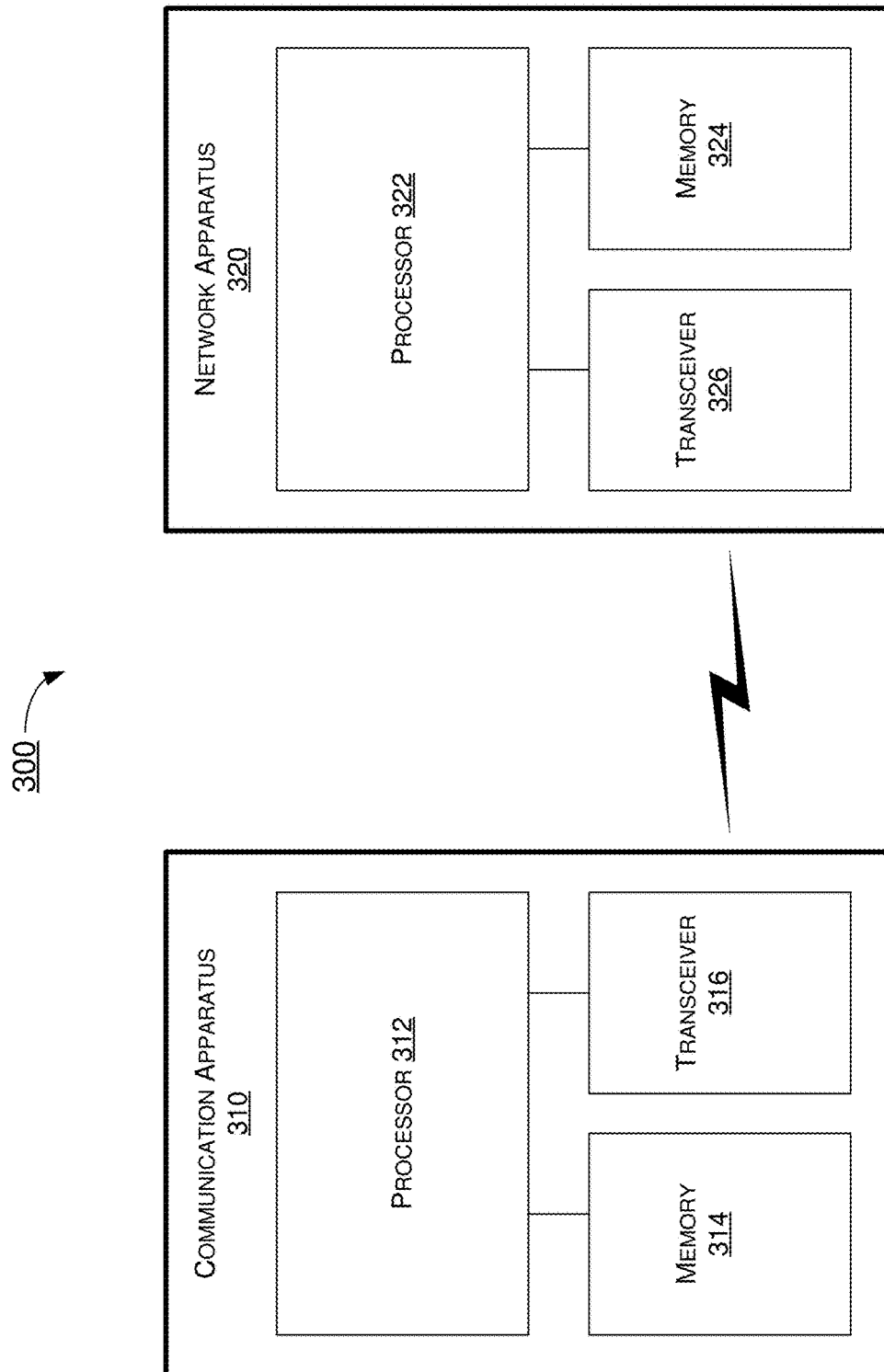
FIG. 3 is a block diagram of an example communication apparatus and an example network apparatus in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to reducing uplink overhead with respect to user equipment and network apparatus in wireless communications, including scenarios 100 and 200 described above as well as processes 400 and 500 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT or NB-IoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT or NB-IoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more RISC or CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may be configured to camp on network apparatus 320. Processor 312 may be configured to monitor, via transceiver 316, a downlink control channel (e.g., PDCCH) of network apparatus 320. Processor 312 may monitor a plurality of PDCCH monitoring occasions to see whether there exist any DCI for communication apparatus 310. Network apparatus 320 may use the DCI to schedule radio resources for a downlink channel (e.g., PDSCH) or an uplink channel (e.g., PUSCH). Processor 312 may be configured to determine whether to transmit a HARQ-ACK feedback according to the monitoring results.

In some implementations, network apparatus 320 may use the DCI format 1_0 or DCI format 1_1 to schedule the PDSCH. In an event that at least one DCI (e.g., DCI format 1_0, DCI format 1_1, or associated DCI for PDSCH transmission) is detected by processor 312, it means that there is downlink data scheduled on the PDSCH for communication apparatus 310. Processor 312 may be configured to receive, via transceiver 316, the downlink data on the PDSCH according to the DCI. Processor 312 may further be configured to transmit, via transceiver 316, a HARQ-ACK feedback corresponding to the downlink data to the network apparatus. Processor 312 may transmit the HARQ-ACK feedback on an uplink channel (e.g., PUCCH or PUSCH). For example, processor 312 may multiplex the HARQ-ACK feedback in the uplink channel transmission. The uplink channel may be scheduled by the DCI format 0_0 (e.g., PUSCH).

In some implementations, in an event that no DCI (e.g., DCI format 1_0, DCI format 1_1, or associated DCI for PDSCH transmission) is detected across a plurality of PDCCH monitoring occasions, it means that there is no downlink data scheduled on the PDSCH for communication apparatus 310. Thus, processor 312 may be configured to skip the HARQ-ACK feedback transmission on the uplink channel (e.g., PUSCH or PUCCH). For example, in an event that processor 312 has not received any PDSCH based on a value of a respective PDSCH-to-HARQ feedback timing field in a DCI format scheduling the PDSCH reception, processor 312 may be configured not to multiplex the HARQ-ACK feedback in the uplink channel transmission. The uplink channel may be scheduled by the DCI format 0_0 (e.g., PUSCH). Accordingly, the HARQ-ACK feedback transmission may be skipped when a pre-defined rule is satisfied (e.g., no DCI is detected). Processor 312 may be able to reduce uplink signaling overheads, avoid radio interference and save UE power consumption.

In some implementations, the uplink channel may be scheduled by the DCI format 0_1 (e.g., PUSCH). Processor 312 may be configured to determine whether to transmit a HARQ-ACK feedback according to a DAI in the DCI. Specifically, processor 312 may be configured to receive, via transceiver 316, the DCI (e.g., DCI format 0_1). The DCI may comprise a DAI field (e.g., $V_{T-DALm}^{UL}$) The DAI field may be used to indicate whether a downlink assignment is assigned to communication apparatus 310. For example, when the DAI field is assigned (e.g., $V_{T-DALm}^{UL}=1$), it means that there is downlink data configured for communication apparatus 310. When the DAI field is not assigned (e.g., $V_{T-DALm}^{UL}=0$), it means that there is no downlink data configured for communication apparatus 310. The DAI filed may comprise one bit indication or multiple bits indication.

In some implementations, after receiving the DCI, processor 312 may be configured to determine whether the DAI is assigned. In an event that the DAI field is assigned (e.g., $V_{T-DALm}^{UL}=1$), processor 312 may be configured to generate a HARQ-ACK codebook and multiplex the HARQ-ACK information in the uplink channel transmission. Processor 312 may transmit, via transceiver 316, the HARQ-ACK feedback on the uplink channel (e.g., PUSCH). In an event that the DAI field is not assigned (e.g., $V_{T-DALm}^{UL}=0$), processor 312 may be configured not to generate a HARQ-ACK codebook (or otherwise cancel the generation thereof) for multiplexing in the uplink channel transmission. Processor 312 may skip the HARQ-ACK feedback transmission on the uplink channel (e.g., PUSCH). Accordingly, processor 312 may be able to determine whether to skip the HARQ-ACK feedback transmission according to an indication (e.g., DAI) in the DCI. When the HARQ-ACK feedback transmission can be skipped, processor 312 may be able to reduce uplink signaling overheads, avoid radio interference and save UE power consumption.

Illustrative Processes

Figure 4:
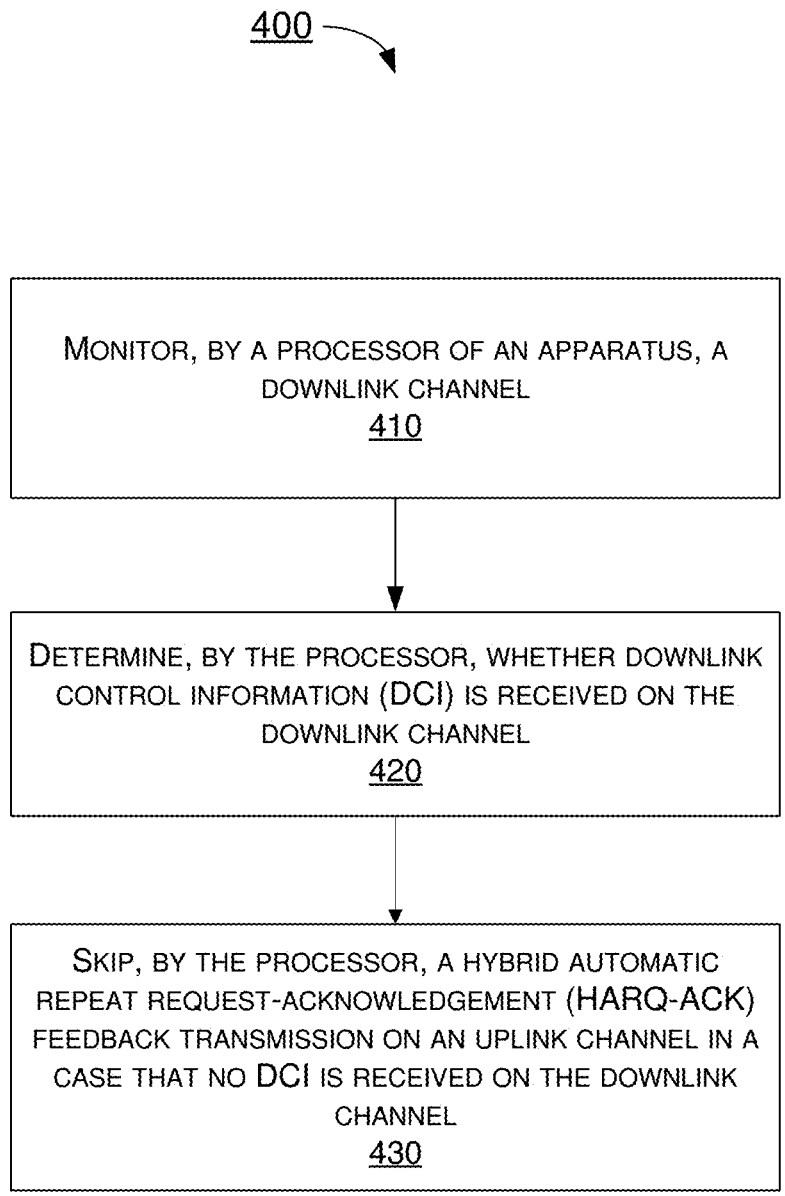
FIG. 4 is a flowchart of an example process in accordance with an implementation of the present disclosure.

FIG. 4 illustrates an example process 400 in accordance with an implementation of the present disclosure. Process 400 may be an example implementation of scenarios 100 and 200, whether partially or completely, with respect to reducing uplink overhead in accordance with the present disclosure. Process 400 may represent an aspect of implementation of features of communication apparatus 310. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 monitoring a downlink channel. Process 400 may proceed from 410 to 420.

At 420, process 400 may involve processor 312 determining whether DCI is received on the downlink channel. Process 400 may proceed from 420 to 430.

At 430, process 400 may involve processor 312 skipping a HARQ-ACK feedback transmission on an uplink channel in an event that no DCI is received on the downlink channel.

In some implementations, the uplink channel may be scheduled by a DCI format 0_0.

In some implementations, the uplink channel may comprise a PUCCH or a PUSCH.

In some implementations, the downlink channel may comprise a PDCCH.

In some implementations, process 400 may involve processor 312 determining whether the DCI scheduling a PDSCH is detected.

In some implementations, process 400 may involve processor 312 transmitting the HARQ-ACK feedback in an event that at least one DCI scheduling the PDSCH is detected.

Figure 5:
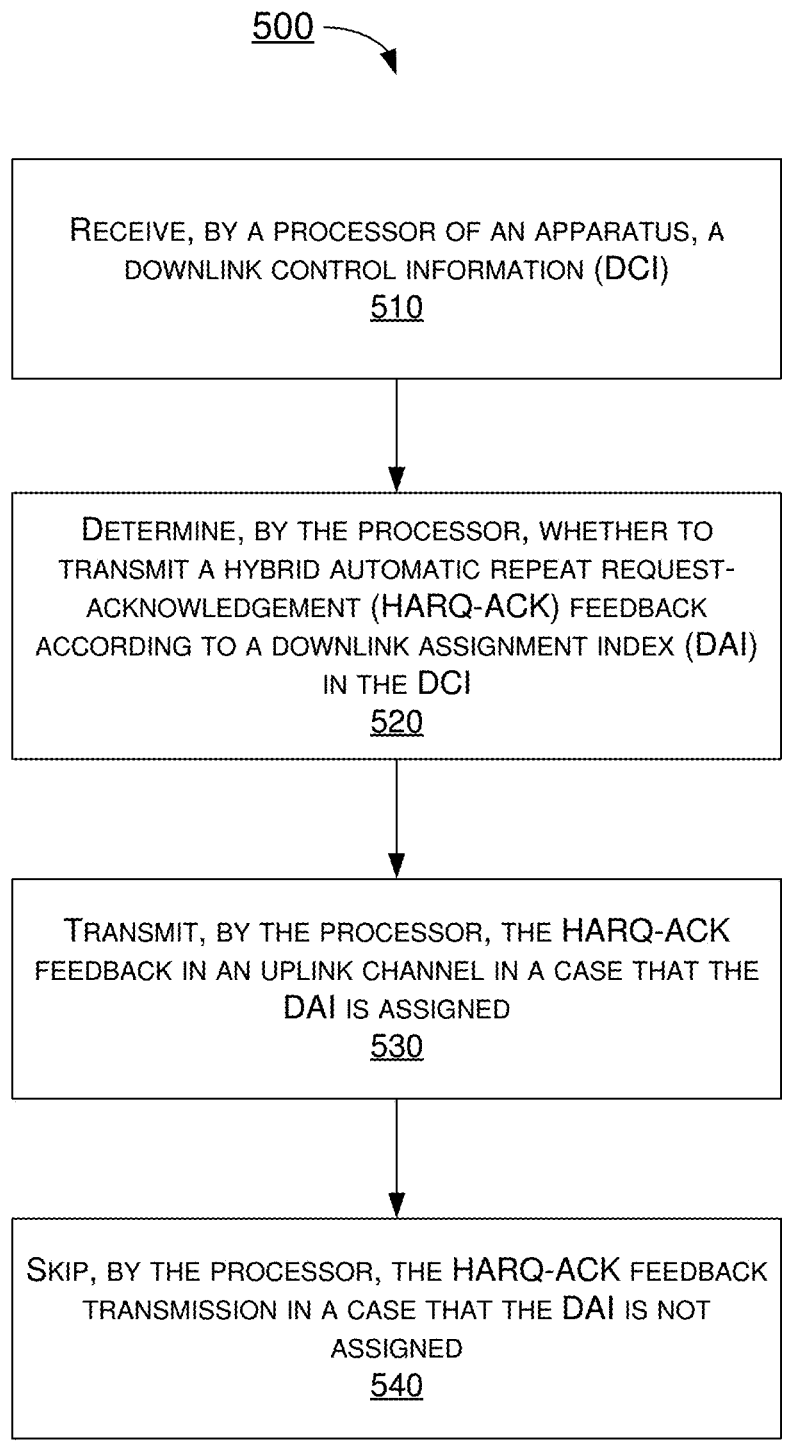
FIG. 5 is a flowchart of an example process in accordance with an implementation of the present disclosure.

FIG. 5 illustrates an example process 500 in accordance with an implementation of the present disclosure. Process 500 may be an example implementation of scenarios 100 and 200, whether partially or completely, with respect to reducing uplink overhead in accordance with the present disclosure. Process 500 may represent an aspect of implementation of features of communication apparatus 310. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 310 or any suitable UE or machine type devices. Solely for illustrative purposes and without limitation, process 500 is described below in the context of communication apparatus 310. Process 500 may begin at block 510.

At 510, process 500 may involve processor 312 of apparatus 310 receiving a DCI. Process 500 may proceed from 510 to 520.

At 520, process 500 may involve processor 312 determining whether to transmit a HARQ-ACK feedback according to a DAI in the DCI. Process 500 may proceed from 520 to 530.

At 530, process 500 may involve processor 312 transmitting the HARQ-ACK feedback in an uplink channel in an event that the DAI is assigned. Process 500 may proceed from 530 to 540.

At 540, process 500 may involve processor 312 skipping the HARQ-ACK feedback transmission in an event that the DAI is not assigned.

In some implementations, the DCI may comprise a DCI format 0_1.

In some implementations, the uplink channel may comprise a PUSCH.

In some implementations, process 500 may involve processor 312 cancelling generation of a HARQ-ACK codebook.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   monitoring, by a processor of an apparatus, a downlink channel;
   determining, by the processor, whether downlink control information (DCI) scheduling a physical downlink shared channel (PDSCH) is received on the downlink channel;
   skipping, by the processor, multiplexing of any hybrid automatic repeat request (HARQ)-related codebook on an uplink channel in an event that no DCI scheduling the PDSCH or semi-persistent scheduling (SPS) PDSCH release is received on the downlink channel; and
   transmitting, by the processor, the HARQ-ACK feedback in an event that at least one DCI scheduling the PDSCH is detected.

2. The method of claim 1, wherein the uplink channel is scheduled by a DCI format 0_0.

3. The method of claim 1, wherein the uplink channel comprises a physical uplink control channel (PUCCH) or a physical uplink shared channel (PUSCH).

4. The method of claim 1, wherein the downlink channel comprises a physical downlink control channel (PDCCH).

5. The method of claim 1, wherein the determining comprises determining whether the DCI scheduling the PDSCH.

6. An apparatus, comprising:
   a transceiver capable of wirelessly communicating with a network node of a wireless network; and
   a processor communicatively coupled to the transceiver, the processor capable of:
      monitoring, via the transceiver, a downlink channel;
      determining whether downlink control information (DCI) is received on the downlink channel;
      skipping multiplexing of any hybrid automatic repeat request (HARQ)-related codebook on an uplink channel in an event that no DCI scheduling the PDSCH or semi-persistent scheduling (SPS) PDSCH release is received on the downlink channel; and
      transmitting, via the transceiver, the HARQ-ACK feedback in an event that at least one DCI scheduling the PDSCH is detected.

7. The apparatus of claim 6, wherein the uplink channel is scheduled by a DCI format 0_0.

8. The apparatus of claim 6, wherein the uplink channel comprises a physical uplink control channel (PUCCH) or a physical uplink shared channel (PUSCH).

9. The apparatus of claim 6, wherein the downlink channel comprises a physical downlink control channel (PDCCH).

10. The apparatus of claim 6, wherein, in determining whether the DCI is received, the processor is capable of:
    determining whether the DCI scheduling the PDSCH is detected.

* * * * *